(12) United States Patent
Prescott et al.

(10) Patent No.: US 10,113,657 B2
(45) Date of Patent: Oct. 30, 2018

(54) MULTIPLE VALVE REFRIGERANT LEAK PROTECTION DEVICE

(71) Applicant: PRESCOTT, INC., Twin Falls, ID (US)

(72) Inventors: Kurt M. Prescott, Twin Falls, ID (US); Katharyn A. Prescott, Twin Falls, ID (US)

(73) Assignee: PRESCOTT, INC., Twin Falls, ID (US)

(*) Notice: Subject to any disclaimer, the term of this patent is extended or adjusted under 35 U.S.C. 154(b) by 0 days.

(21) Appl. No.: 15/688,664

(22) Filed: Aug. 28, 2017

(65) Prior Publication Data

US 2018/0073647 A1 Mar. 15, 2018

Related U.S. Application Data

(60) Provisional application No. 62/385,567, filed on Sep. 9, 2016.

(51) Int. Cl.
| | |
|---|---|
| *F16K 15/18* | (2006.01) |
| *F16K 11/00* | (2006.01) |
| *F25B 45/00* | (2006.01) |
| *F16K 15/04* | (2006.01) |
| *F16K 5/06* | (2006.01) |

(52) U.S. Cl.
CPC .............. *F16K 15/18* (2013.01); *F16K 5/06* (2013.01); *F16K 11/00* (2013.01); *F16K 15/04* (2013.01); *F16K 15/183* (2013.01); *F25B 45/00* (2013.01); *F25B 2345/006* (2013.01); *Y10T 137/3584* (2015.04); *Y10T 137/87917* (2015.04)

(58) Field of Classification Search
CPC ........ F16K 15/18; F16K 11/00; F16K 15/183; Y10T 137/3584; Y10T 137/3724; Y10T 137/87917; F25B 45/00; F25B 2345/006
See application file for complete search history.

(56) References Cited

U.S. PATENT DOCUMENTS

| | | | |
|---|---|---|---|
| 3,170,495 A * | 2/1965 | Wagner | F02M 1/00 137/317 |
| 3,981,482 A * | 9/1976 | Callahan, Jr. et al. | F16K 5/0631 137/454.2 |
| 5,183,078 A * | 2/1993 | Sorrell | F02M 65/00 137/881 |
| 8,302,411 B2 * | 11/2012 | Martin | F25B 45/00 62/149 |

* cited by examiner

*Primary Examiner* — Kevin Lee
(74) *Attorney, Agent, or Firm* — Richard D. Clarke

(57) ABSTRACT

The present application relates to an apparatus of joined valves used to test and maintain refrigeration systems. More particularly, the present application provides a Multiple Valve Refrigerant Leak Protection Device having a specifically preferred embodiment including a ball valve with a soldered pipe connection, as part of the fitting with a Schrader valve, primarily used for the maintenance and transfer of refrigerant from commercial refrigeration equipment. Schrader valves are most commonly used in this application with a ball valve. A ball valve would be the preferred valve, but a wide range of valves could be used. The resulting valves can be used to test and maintain refrigeration systems, and act to prevent leakage where refrigeration fluids are often released to the atmosphere when the system is being maintained or repaired.

16 Claims, 5 Drawing Sheets

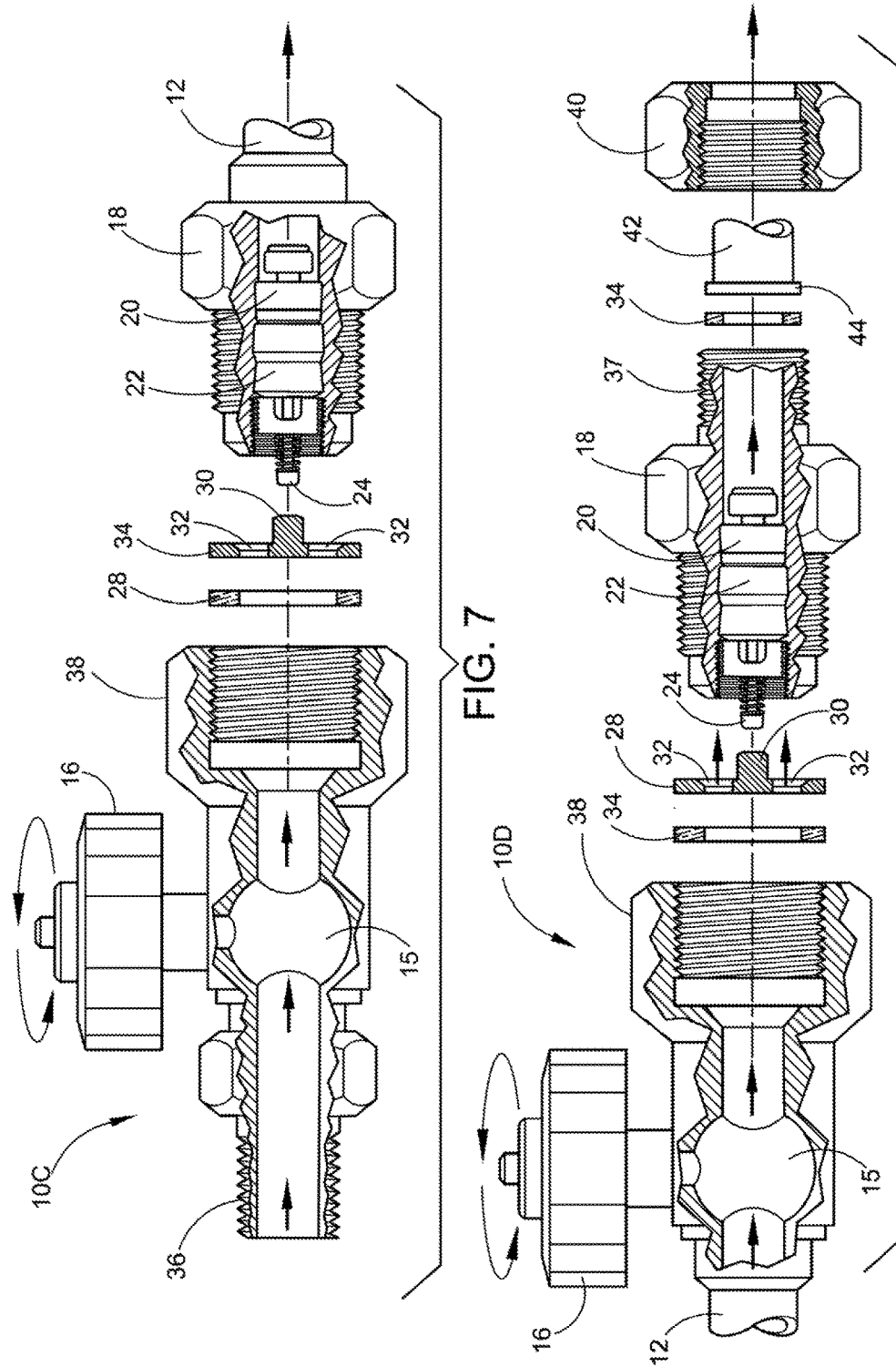

MULTIPLE VALVE REFRIGERANT LEAK PROTECTION DEVICE

FIELD OF THE INVENTION

The present invention relates to an apparatus of joined valves used to test and maintain refrigeration systems. More particularly, the present application provides a Multiple Valve Refrigerant Leak Protection Device having a specifically configured specialty fitting preferred embodiment including a ball valve with a soldered pipe connection, as part of the specialty fitting with the Schrader valve, primarily used for the maintenance and transfer of refrigerant from residential, HVAC, and commercial refrigeration equipment but has the capability of a wide range of additional uses having the unique combination of two valves. Schrader valves are most commonly used in this application with a ball valve. A ball valve would be the preferred valve, but a wide range of valves could be used and still remain within the scope of this application.

BACKGROUND OF THE INVENTION

Refrigeration systems are widely used in commercial, industrial and residential applications for cold storage and air conditioning. Routine maintenance of refrigeration systems often involves the re-supplying of fluid which may have been lost as a result of a leak in the unit. Grocery stores have approximately 2,500 to 3,000 Schrader maintenance ports in their refrigeration systems. Every time a refrigeration technician gauges up to a suction/liquid line they will lose refrigerant through the Schrader valve and the same thing will happen when the technician removes his/her gauges. Anytime that you work on the existing maintenance port valve system it will leak some refrigerant.

The handling and storage of all refrigeration fluids has become a very important subject and it is now considered a hazardous material per EPA and must be handled with care and disposed of properly. If a quantity of fluid is collected it must be returned to the manufacturer for proper disposal.

The Schrader valve (also called American valve) is a type of pneumatic tire valve used on virtually every motor vehicle in the world today. The Schrader company, for which it was named, was founded in 1844 by August Schrader. The original Schrader valve design was patented in the United States in 1893. The Schrader valve consists of a valve stem into which a valve core is threaded, and is used on virtually all automobile tires and motorcycle tires and most wide rimmed bicycle tires. The valve core is a poppet valve assisted by a spring.

In addition to tube and tubeless tires, Schrader valves of varying diameters are used on many refrigeration and air conditioning systems to allow servicing, including recharging with refrigerant; by plumbers conducting leak-down pressure tests on pipe installations; as a bleeding and test port on the fuel rail of some fuel injected engines; on bicycle air shock absorbers to allow adjustment of air pressure according to the rider's weight; and in the buoyancy compensator (BC) inflators of SCUBA systems where the ability to easily disconnect an air hose (even underwater) without the loss of tank air is critical. Schrader valves are also widely used in high-pressure hydraulic systems on aircraft. Many domestic fire extinguishers use an internal valve identical to a Schrader valve, but with a lever on top to enable quick release of the pressurized content.

A Schrader valve consists of an externally threaded hollow cylindrical metal tube, typically of nickel plated brass. In the center of the exterior end is a metal pin pointing along the axis of the valve stem; the pin's end is approximately flush with the end of the valve body. All Schrader valves used on tires have threads and bodies of a single standard size at the exterior end, so caps and tools generally are universal for the valves on all common applications. The core of the valve can be removed or tightened with a tool.

Industrial Schrader valves are available in different diameters and valve core variants and are used in refrigeration, propane, and a variety of other uses. In Schrader valves the air chuck must depress the spring-loaded pin before air can flow during inflation.

Various types of modulating valves, such as incrementally position-able valves, are widely used in refrigerant circuits for refrigeration and air-conditioning systems. For instance, modulating valves are frequently used at nodes of diverging loops of circuits to provide refrigerant for heat reclaim or for defrosting evaporators of refrigeration display units. Such valves are also used in split condensers and hot-gas applications. These valves are used to control the ratios of refrigerant conveyed to the various elements of the circuits or to control the flow of refrigerant through the lines. The modulating action of the valves prevents water hammer in the refrigerant lines, which could have adverse effects on the various elements of such circuits. Mueller™ Refrigeration Co. provides such modulating valves, under the name Cycle Master™.

However, the modulating valves of refrigerant circuits are subjected to the harsh conditions typical to circuits. For instance, the refrigerant in refrigerant circuits is at relatively high temperatures and fluctuates between large temperature variations. Furthermore, the refrigerant is compressed to relatively high pressures, and the modulating valves are often employed to create pressure drops in the circuits. Finally, the refrigerants typically known and used are often of a corrosive nature.

For these reasons, some modulating valves have been known to leak at the stem. A plurality of negative effects results from such leaks. For instance, substantial losses of refrigerant can cause inefficient refrigeration cycles and shutdowns. Furthermore, the refrigerants are often harmful to the environment, and refrigerant losses to the environment must be prevented per EPA. Finally, downtimes are very costly and are risky as the contents of the refrigeration display units cannot be subjected to temperature increases or decreased without the risk of being fouled.

Numerous innovations for Leak Protection Devices have been provided in the prior art described as follows. Even though these innovations may be suitable for the specific individual purposes to which they address, they differ from the present design as hereinafter contrasted. The following is a summary of those prior and patents most relevant to the application at hand, as well as a description outlining the difference between the features of the present invention and those of the prior art.

U.S. Pat. No. 6,874,753 of Dubé et. al describes a sealing device for a modulating valve of the type having a valve body defining a flow passage, and inlet and outlets, a valve displaceable in the flow passage, and an actuator having an actuator rod rotatably coupled to the valve for displacing the valve in the flow passage. The sealing device comprises a body surrounding the actuator rod. A connector is adapted to secure the body of the sealing device to the valve body. Seals are provided between the body of the sealing device and the actuator rod, and between the body of the sealing device and the valve body, to prevent fluid flow there between. The body of the sealing device and the seals are adapted to conceal and contain fluid leaks, whereby no fluid is lost due to a leaking modulating valve.

This patent describes a sealing device for a modulating valve but does not incorporate the unique feature of using two different styles of valves to control the loss of refrigerant during the needed maintenance operations the way that the Multiple Valve Refrigerant Leak Protection Device does.

U.S. Patent Application Publication No. US 2013/0291976 A1 of Chang describes a quick release coupling that includes a socket defining a first passage in a connection port thereof, a locking member mounted in a front of the end of the socket and adapted for locking an inserted external male mating connector, an air valve control device mounted if a rear end of the socket, and a leak-proof device, which includes a stopper mounted in the front end of the socket and defining an axially extending second passage and a transversely extending third passage and a plurality of gasket rings mounted around the stopper at two opposite lateral sides of the third passage for allowing fluid communication between the first passage and the second and third passage or blocking the first passage from the second and third passage after movement of the stopper relative to the socket between two positions.

This patent describes a quick release coupling that has a common tendency of leaking. The Multiple Valve Refrigerant Leak Protection Device solves this problem by using two common widely used valves incorporated into one single device.

U.S. Patent Application Publication No. US 2013/0277008 A1 of Ishikura et al. describes a liquid leakage prevention device, liquid leakage prevention method and liquid cooling system. In a liquid cooling system having a structure in which a joint is attached or detached while inserting or removing a card board, when a liquid from a connection portion of the joint, the leaked liquid confined within housing is prevented from spilling out and scattering to surrounding electronic components when the card board is disconnected. The liquid cooling system includes male and female joints, and housings that fix those joints to each other. A water absorptive material is disposed on an inner wall of the housing of the male joint, and a seal member is disposed on an inner wall of the housing of the female joint, and a seal member is disposed on an inner wall of the housing of the female joint. The liquid cooling system includes a liquid leakage detection function. When the liquid cooling detects the liquid leakage, the liquid cooling system stops the operation of the pump, and prevents the liquid from being further leaked.

This patent describes an involved process but does not use the simple method of incorporating two common widely used valves incorporated into one single device used in the Multiple Valve Refrigerant Leak Protection Device.

In this respect, before explaining at least one embodiment of the Multiple Valve Refrigerant Leak Protection Device in detail it is to be understood that the design is not limited in its application to the details of construction and to the arrangement, of the components set forth in the following description or illustrated in the drawings. The Multiple Valve Refrigerant Leak Protection Device is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present Multiple Valve Refrigerant Leak Protection Device. It is important, therefore, that the claims be regarded as including such equivalent construction insofar as they do not depart from the spirit and scope of the present application.

SUMMARY OF THE INVENTION

The principle advantage of the Multiple Valve Refrigerant Leak Protection Device is to eliminate leakage in the handling and storage of all refrigeration fluids.

Another advantage of the Multiple Valve Refrigerant Leak Protection Device is that it combines the operation of two separate common types of valves in a single unit to eliminate leaking and loss of refrigeration fluids during maintenance operations.

Another advantage with Multiple Valve Refrigerant Leak Protection Device is that the ball valve can be closed and the Schrader valve can be replaced without draining the complete refrigeration system.

Another advantage is the Multiple Valve Refrigerant Leak Protection Device has a wide variety of attachment means.

Another advantage is to create a safer and more environmentally friendly way for people to handle refrigerant fluids and other environmentally sensitive gasses and liquids safely.

A further advantage is to reduce the maintenance time and shut-down possibilities at commercial food, industrial and HVAC storage and processing facilities.

The preferred embodiment of this will be the Multiple Valve Refrigerant Leak Protection Device having a ball valve with a soldered pipe connection as part of the specialty fitting with the Schrader valve.

Many types of valves have a tendency to leak depending upon there composition and the temperature of the material that is put through them. When that material is environmentally hazardous, the leakage can be very dangerous to those working in the area. The only way to protect from this problem is in using more than one valve in combination. By using two different valves of a different design this problem can be solved when transferring or holding an environmentally hazardous material.

The Multiple Valve Refrigerant Leak Protection Device has been specifically designed for the maintenance and transfer of refrigerant from commercial refrigeration equipment and HVAC equipment, but has the capability of a wide range of additional uses having the unique combination of two valves. Schrader valves are most commonly used in this application with a ball valve. A ball valve would be the preferred valve, but a wide range of valves could be used and still remain within the scope of this application.

The Multiple Valve Refrigerant Leak Protection Device can be used in many different areas in today's world. The main areas that the device will be used are HVAC AC Units:
  Fan Cycling Controls
  Low Pressure Controls
  High Pressure Controls
  Suction/Liquid Line Service Parts
  Grocery Stores have approximately 2,500 to 3,000 Schrader Ports. Every time a refrigeration technician gauges up to a suction/liquid line you will lose refrigerant through the Schrader and the same thing will happen when the technician removes his/her gauges. Anytime you mess with the Schrader, on any unit, it will leak some refrigerant.

Self-contained equipment does not come with access ports (item used to gauge up to check pressures) so refrigeration technicians must use piercing valves and they always leak. All self-contained equipment units are critically charged systems in ounces.

When technicians reclaim refrigerant from any unit they can hook up to the Multiple Valve Refrigerant Leak Protection Device. Once the Multiple Valve Refrigerant Leak Protection Device is installed on a unit it can be left in place to make it easier and safer for technicians to reclaim refrigerant from systems and to check the pressures.

With Electronic Actuating Ball Valve a computerized system or Program, the Multiple Valve Refrigerant Leak Protection Device can be activated and controlled from the owner's computer. Through the computerized system there can also be an automatic detection of a refrigerant leak that will automatically turn the ball valve to the closed position to shut off the leak or to open it back up.

The program could also be used in a larger capacity. In the motor rooms of large operations, the Multiple Valve Refrigerant Leak Protection Device can be programmed to control each unit for refrigerant leak detection and send a code to shut the Multiple Valve Refrigerant Leak Protection Device on each unit so that the store does not lose product and can save units from going down.

In hospitals the Multiple Valve Refrigerant Leak Protection Device can be used on chillers for the same purpose. They are like HVAC Units. The Multiple Valve Refrigerant Leak Protection Device can shut of VAV's (Variable Air Volume) which are like liquid lines in Evaporator Coils, Condensing Units and Motor Rooms.

Any unit, object or location that has HVAC system should have a Multiple Valve Refrigerant Leak Protection Devices installed:
  Cars
  Boats/Ships/Yachts
  Homes
  Ice machines
  Aircraft/Airplanes/Drones
  NASA/Space Craft/Space Stations
  Buses
  Trains/Light Rail
  Trams
  Semi-Trucks
  Semi-Truck Refrigerated Trailers
  Household and Commercial Appliances
  Hospitals/Medical Equipment
  Ammonia Systems
  Anything with a contained gas that you can check with a gauge There has thus been outlined, rather broadly the more important features of the Multiple Valve Refrigerant Leak Protection Device in order that the detailed description thereof that follows may be better understood and in order that the present contribution to the art may be better appreciated. There are other additional features of the design that will be described hereinafter and which will form the subject matter of the claims appended hereto.

BRIEF DESCRIPTION OF THE DRAWINGS

The accompanying drawings, which are incorporated in and form a part of this specification, illustrate embodiments of the design and together with the description, serve to explain the principles of the Multiple Valve Refrigerant Leak Protection Device.

FIG. 7 depicts a cross section of the ball valve section of the Multiple Valve Refrigerant Leak Protection Device having a threaded male pipe connection and a threaded connection to the specialty Schrader valve fitting.

FIG. 8 depicts a cross section of the ball valve section of the Multiple Valve Refrigerant Leak Protection Device having a soldered pipe connection and a threaded connection to the specialty Schrader valve fitting attached by the means of a male threaded connection with pipe and lock nut.

DETAILED DESCRIPTION OF THE PREFERRED EMBODIMENTS

As required, detailed embodiments of the present design are disclosed herein, however, it is to be understood that the disclosed embodiments are merely exemplary of the Multiple Valve Refrigerant Leak Protection Device 10A, 10B, 10C, 10D and 10E that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure.

Figure 1:
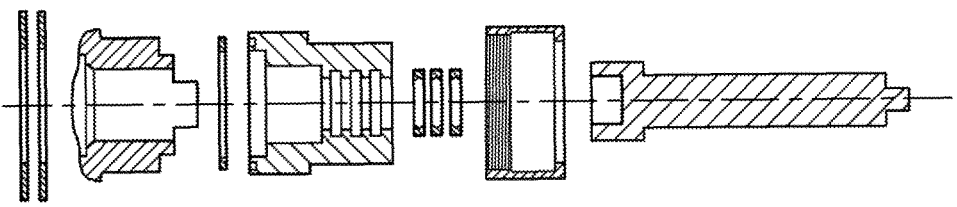
FIG. 1 depicts a cross section through the PRIOR ART of a sealing valve of Dubé et al., illustrating one example of a Refrigeration Modulating Valve Sealing Device.

FIG. 1 depicts a cross section through the PRIOR ART of a sealing valve of Dubé et al., illustrating one example of a Refrigeration Modulating Valve Sealing Device.

Figure 2:
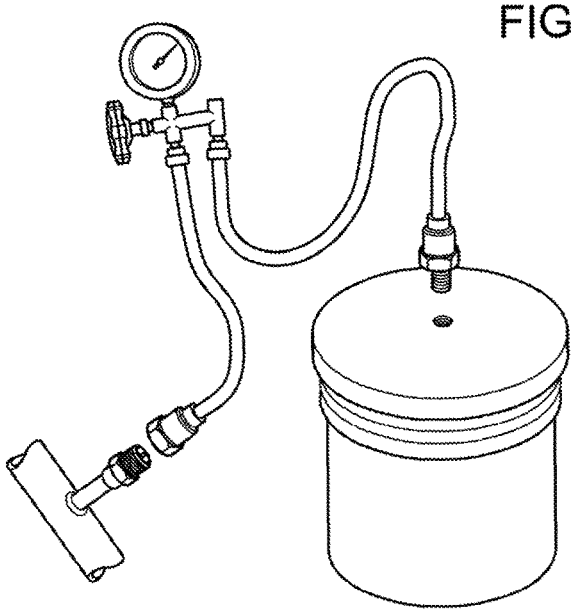
FIG. 2 depicts a PRIOR ART configuration where during maintenance process refrigerant is transferred from a refrigeration unit access port, through a hose and gauge, into a canister.

FIG. 2 depicts a PRIOR ART configuration where during maintenance process refrigerant is transferred from a refrigeration unit access port, through a hose and gauge, into a canister.

Figure 3:
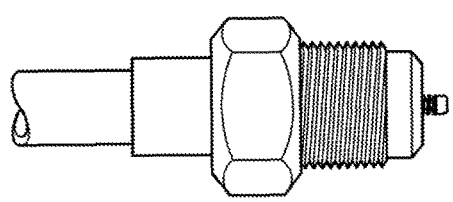
FIG. 3 depicts a PRIOR ART commonly used conventional access port found on most refrigeration units.

FIG. 3 depicts a PRIOR ART commonly used conventional access port found on most refrigeration units.

Figure 4:
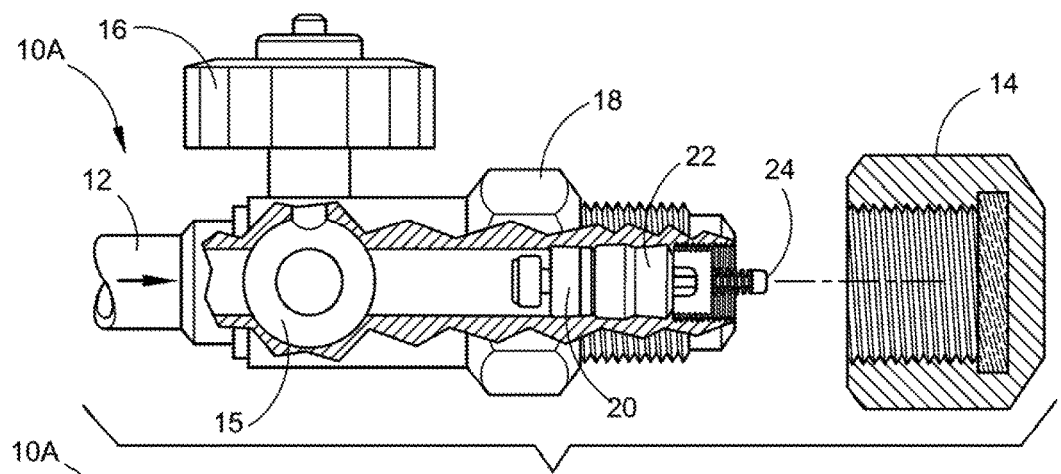
FIG. 4 depicts a cross section of a Multiple Valve Refrigerant Leak Protection Device having a soldered pipe connection with a valve cap exploded away.

FIG. 4 depicts a cross section of the preferred embodiment of the Multiple Valve Refrigerant Leak Protection Device 10A with the specialty Schrader valve fitting and having a soldered pipe connection 12 with the valve cap 14 exploded away. The ball valve 15 handle 16 will be colored green to indicate hazardous material control. The specialty Schrader valve fitting 18 is an integral part of the Multiple Valve Refrigerant Leak Protection Device 10A.

Figure 5:
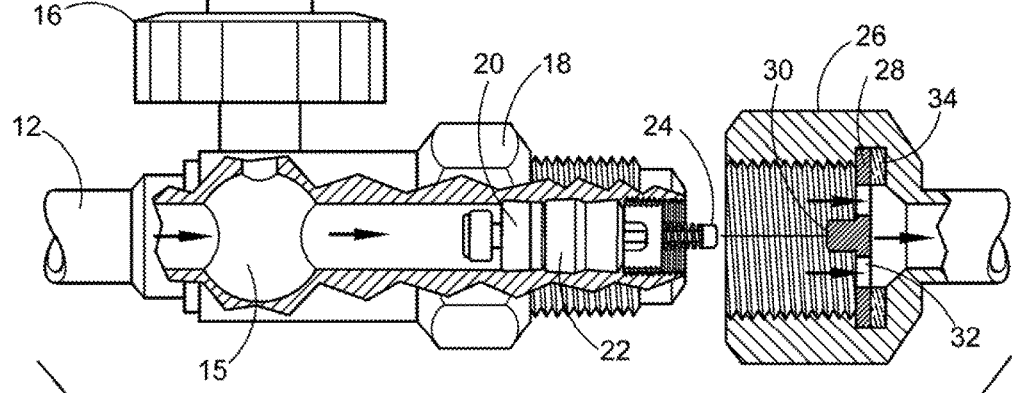
FIG. 5 depicts a cross section of a Multiple Valve Refrigerant Leak Protection Device having a soldered pipe connection with a refrigerant drain fitting exploded away.

FIG. 5 depicts a cross section of a Multiple Valve Refrigerant Leak Protection Device 10A with ball valve 15 section and the specialty Schrader valve fitting 18 having a soldered pipe connection 12. The ball valve 15 handle 16 will be colored green to indicate hazardous material control. The refrigerant drain fitting 26 with an adapter 28 has a pin depression section 30 with flow through orifices 32 and a gasket 34 has been exploded away. With the Schrader valve 20 the air chuck 22 needs to be depressed by the spring-loaded pin 24 before anything can flow during refrigerant fluid transfer.

Figure 6:
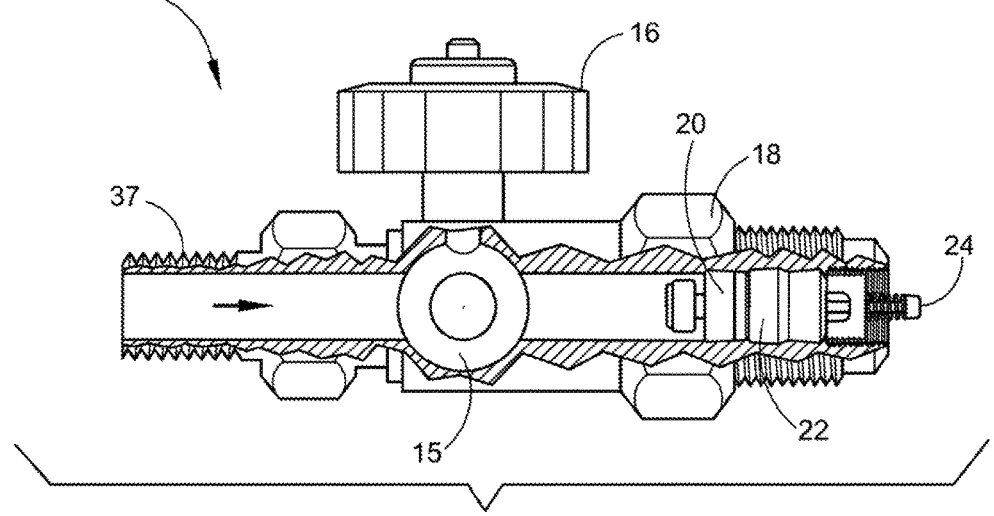
FIG. 6 depicts a cross section of a Multiple Valve Refrigerant Leak Protection Device having a threaded pipe connection.

FIG. 6 depicts a cross section of a Multiple Valve Refrigerant Leak Protection Device 10B with ball valve 15 section and the specialty Schrader valve fitting 18 having a threaded male pipe connection 37. The ball valve 15 handle 16 will be colored green to indicate hazardous material control. The specialty Schrader valve fitting 18 is an integral part of the Multiple Valve Refrigerant Leak Protection Device 10B.

FIG. 7 depicts a cross section of the ball valve IS section of the Multiple Valve Refrigerant Leak Protection Device 10C that has a threaded male pipe connection 37 and a threaded connection coupler 38. The ball valve 15 handle 16 will be colored green to indicate hazardous material control. An adapter 28 that has a pin depression section 30 with flow through orifices 32 is next to the gasket 34. The specialty Schrader valve fitting 18 will join threaded connection coupler 38 having a soldered pipe connection 12. The specialty Schrader valve fitting 18 is an integral part of the Multiple Valve Refrigerant Leak Protection Device 10C.

FIG. 8 depicts a cross section of the ball valve 15 section of the Multiple Valve Refrigerant Leak Protection Device 10D having a soldered pipe connection 12 and a threaded connection coupler 38. The ball valve 15 handle 16 will be colored green to indicate hazardous material control. An adapter 28 that has a pin depression section 30 with flow through orifices 32 is next to the gasket 34. The specialty Schrader valve fitting 18 will join the threaded connection coupler 38 having a male pipe connection 37. A locking nut 40 restrains a copper pipe 42 with a shoulder 44 and gasket 34. The specialty Schrader valve fitting 18 is an integral part of the Multiple Valve Refrigerant Leak Protection Device 10D.

Figure 9:
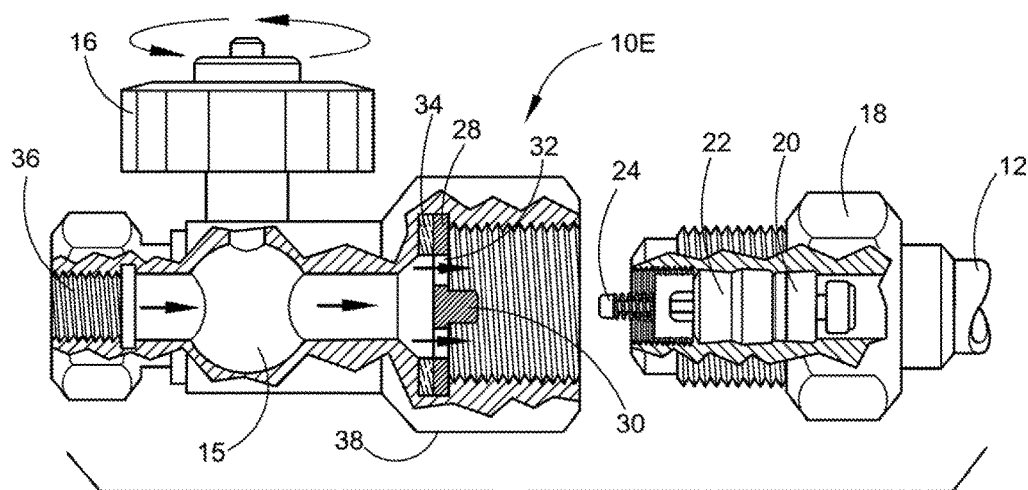
FIG. 9 depicts a cross section of the ball valve section of the Multiple Valve Refrigerant Leak Protection Device having a threaded female pipe connection and a threaded connection to the specialty Schrader valve fitting.

FIG. 9 depicts a cross section of the ball valve 15 section of the Multiple Valve Refrigerant Leak Protection Device 10E having a threaded female pipe connection 36 and a threaded connection coupler 38 with an adapter 28 that has a pin depression section 30 with flow through orifices 32 next to the gasket 34. The ball valve 15 handle 16 will be colored green to indicate hazardous material control. The specialty Schrader valve fitting 18 will join the threaded connection coupler 38 having a soldered pipe connection 12. The specialty Schrader valve fitting 18 is an integral part of the Multiple Valve Refrigerant Leak Protection Device 10E.

Figures 10, 11:
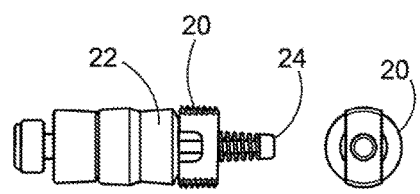
FIG. 10 depicts a side view of a Schrader valve.
FIG. 11 depicts an end view of the Schrader valve.

FIG. 10 depicts a side view of a Schrader valve 20 where the air chuck 22 needs to be depressed by the spring-loaded pin 24 before anything can flow during refrigerant fluid transfer.

FIG. 11 depicts an end view of the Schrader valve 20.

Figure 12:
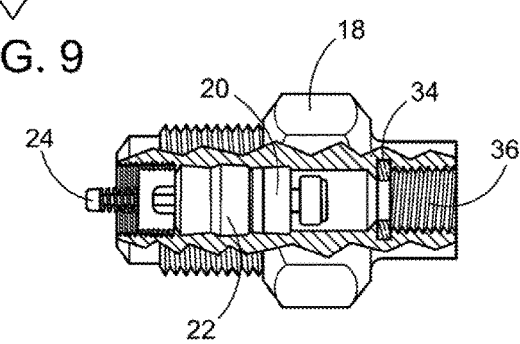
FIG. 12 depicts a cross section of the specialty fitting with the Schrader valve having a female pipe thread.

FIG. 12 depicts a cross section of the specialty Schrader valve fitting 18 having a threaded female pipe connection 36.

Figure 13:
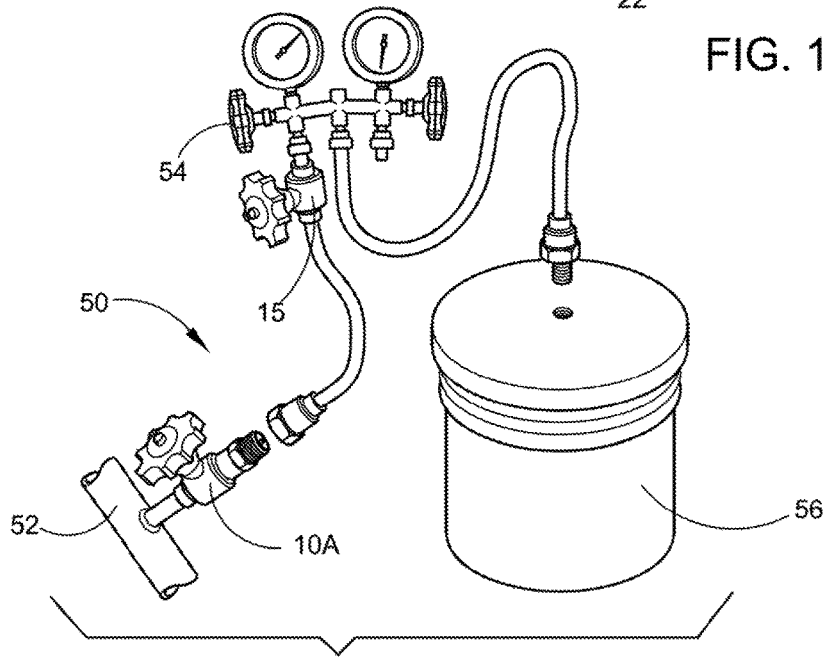
FIG. 13 depicts an optional refrigerant drain operation using a Multiple Valve Refrigerant Leak Protection Device having a soldered pipe connection to the refrigerant line.

FIG. 13 depicts an optional refrigerant drain operation 50 using a Multiple Valve Refrigerant Leak Protection Devices 10A having a soldered pipe connection 12 to the refrigerant line 52 and directed through the flow control valve 54 to meter the flow of material into the canister 56.

Figure 14:
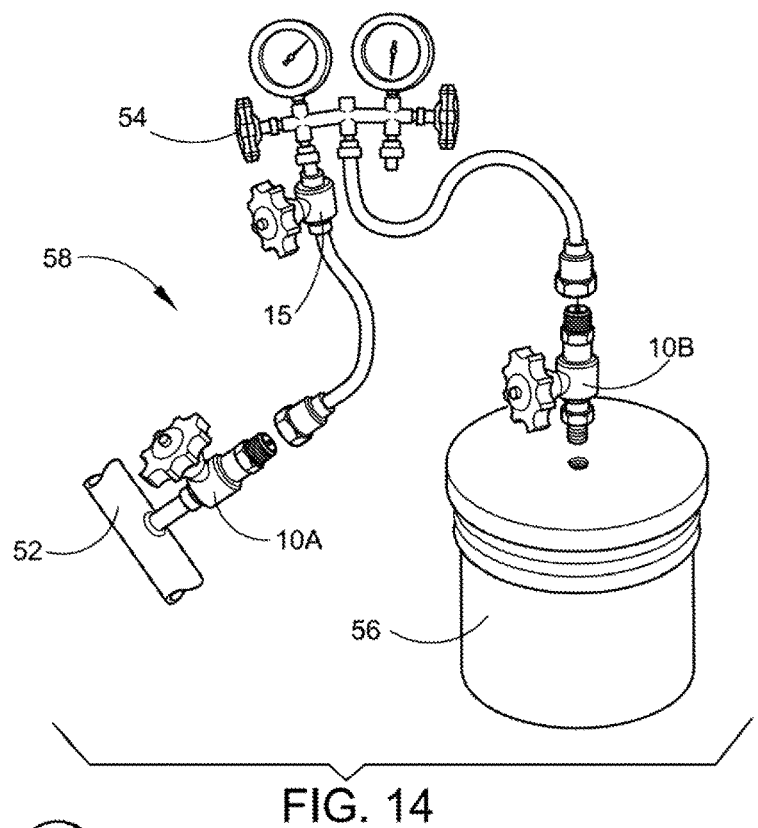
FIG. 14 depicts an optional refrigerant drain operation using two Multiple Valve Refrigerant Leak Protection Devices, one soldered pipe connection to the refrigerant line and one threaded into the storage canister.

FIG. 14 depicts an optional refrigerant drain operation 58 using two Multiple Valve Refrigerant Leak Protection Devices 10A with a soldered pipe connection 12 to the refrigerant line and second Refrigerant Leak Protection Devices 10B where the flow is directed through the flow control valve 54 to meter the flow of material into the canister 56.

Figure 15:
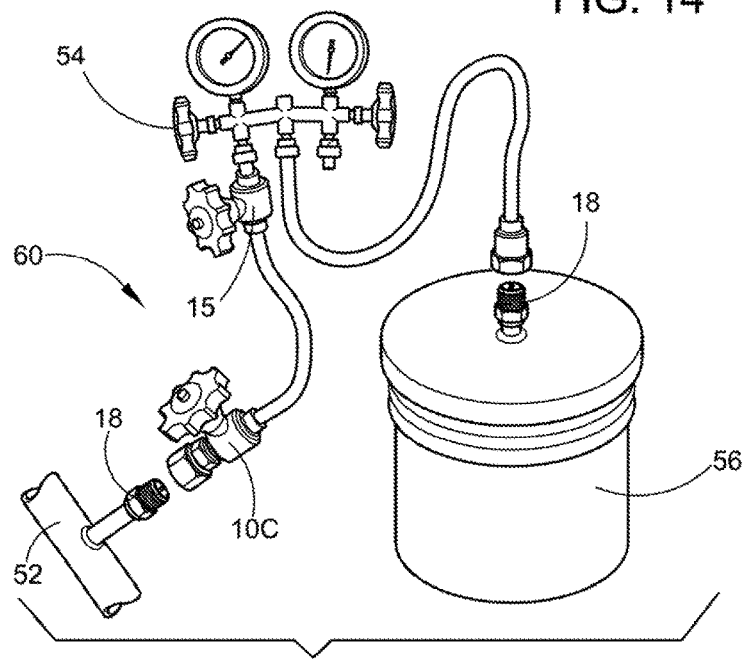
FIG. 15 depicts an optional refrigerant drain operation using the specialty fitting with the Schrader valve attached to the refrigerant line with the ball valve section of the Multiple Valve Refrigerant Leak Protection Device attached to the line to the storage canister.

FIG. 15 depicts an optional refrigerant drain operation 60 using the specialty Schrader valve fitting 18 soldered to the refrigerant line 52 and connected to the Refrigerant Leak Protection Devices 10C where the flow is directed through the flow control valve 54 to meter the flow of material to a specialty Schrader valve fitting 18 in the storage canister 56.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the Multiple Valve Refrigerant Leak Protection Device of the application, which is measured by the claims, nor is it intended to be limiting as to the scope of the invention in any way.

We claim:

1. A multiple valve refrigerant leakage protection device comprising:
    (a) a ball valve section having an interior portion and exterior portion, including a ball valve housing and a rotatable handle located on said ball valve exterior portion, and a ball valve and a refrigerant flow-through channel located within said ball valve interior portion; and
    (b) a Schrader valve section having an interior portion and an exterior portion, including a Schrader valve fitting and a spring-loaded pin located on said Schrader valve exterior portion, and an air chuck and a refrigerant flow-through channel located within said Schrader valve interior portion;
    wherein said Schrader valve section further includes a threaded male pipe connection, and further wherein said ball valve section further includes a female threaded connection coupler, an adapter, a gasket having a pin depression section and flow through orifices, whereby said Schrader valve section threaded male pipe connection mates with said ball valve section female threaded connection coupler, and thereby integrating said ball valve section and said Schrader valve section into a single unit;
    wherein said ball valve section and said Schrader valve section are integrated into a single combined unit, and when in use as a single combined unit prevent leakage of refrigerant during refrigerant drainage and fill operations.

2. The multiple valve refrigerant leakage protection device according to claim 1, wherein said ball valve section further includes a soldered pipe connection.

3. The multiple valve refrigerant leakage protection device according to claim 1, wherein said ball valve section further includes a threaded male pipe connection.

4. The multiple valve refrigerant leakage protection device according to claim 1, wherein said Schrader valve section further includes a soldered pipe connection.

5. The multiple valve refrigerant leakage protection device according to claim 1, wherein said Schrader valve section further includes specialty Schrader valve fitting having a soldered pipe connection.

6. The multiple valve refrigerant leakage protection device according to claim 1, wherein said Schrader valve section further includes specialty Schrader valve fitting having a gasket and locking nut configured for connection to a copper pipe.

7. The multiple valve refrigerant leakage protection device according to claim 1, wherein said Schrader valve section further includes specialty Schrader valve fitting having a threaded female pipe connection.

8. The multiple valve refrigerant leakage protection device according to claim 1, wherein said ball valve handle is colored green.

9. A method for making a multiple valve refrigerant leakage protection device comprising the steps of:
(a) providing a ball valve section having an interior portion and exterior portion, including a ball valve housing and a rotatable handle located on said ball valve exterior portion, and a ball valve and a refrigerant flow-through channel located within said ball valve interior portion; and
(b) providing a Schrader valve section having an interior portion and an exterior portion, including a Schrader valve fitting and a spring-loaded pin located on said Schrader valve exterior portion, and an air chuck and a refrigerant flow-through channel located within said Schrader valve interior portion;
wherein said Schrader valve section further includes a threaded male pipe connection, and further wherein said ball valve section further includes a female threaded connection coupler, an adapter, a gasket having a pin depression section and flow through orifices, whereby said Schrader valve section threaded male pipe connection mates with said ball valve section female threaded connection coupler, and thereby integrating said ball valve section and said Schrader valve section into a single unit;
wherein said ball valve section and said Schrader valve section are integrated into a single combined unit, and when in use as a single combined unit prevent leakage of refrigerant during refrigerant drainage and fill operations.

10. The method for making a multiple valve refrigerant leakage protection device according to claim 9, wherein said ball valve section further includes a soldered pipe connection.

11. The method for making a multiple valve refrigerant leakage protection device according to claim 9, wherein said ball valve section further includes a threaded male pipe connection.

12. The method for making a multiple valve refrigerant leakage protection device according to claim 9, wherein said Schrader valve section further includes a soldered pipe connection.

13. The method for making a multiple valve refrigerant leakage protection device according to claim 9, wherein said Schrader valve section further includes specialty Schrader valve fitting having a soldered pipe connection.

14. The method for making a multiple valve refrigerant leakage protection device according to claim 9, wherein said Schrader valve section further includes specialty Schrader valve fitting having a gasket and locking nut configured for connection to a copper pipe.

15. The method for making a multiple valve refrigerant leakage protection device according to claim 9, wherein said Schrader valve section further includes specialty Schrader valve fitting having a threaded female pipe connection.

16. The method for making a multiple valve refrigerant leakage protection device according to claim 9, wherein said ball valve handle is colored green.

\* \* \* \* \*